United States Patent [19]
Mueller et al.

[11] Patent Number: 5,700,592
[45] Date of Patent: Dec. 23, 1997

[54] ELECTROLUMINESCENT MATERIALS FOR EDGE EMITTERS

[75] Inventors: Gerd O. Mueller; Regina B. Mueller-Mach, both of San Jose, Calif.

[73] Assignee: Hewlett-Pacard Company, Palo Alto, Calif.

[21] Appl. No.: 571,566

[22] Filed: Dec. 13, 1995

[51] Int. Cl.⁶ ............................................. H05B 33/00
[52] U.S. Cl. ...................... 428/690; 428/691; 428/917; 313/503; 313/507
[58] Field of Search ........................ 428/690, 691, 428/917; 313/503, 507

[56] References Cited

U.S. PATENT DOCUMENTS 5,299,217  3/1994  Migita et al. ........................ 372/45
5,311,035  5/1994  Nire .................................... 257/15

*Primary Examiner*—Charles Nold

[57] ABSTRACT

An electroluminescent edge emitting device having an improved operational life and electroluminescent efficiency includes a host material composed of at least two Group II elements and at least one element selected from Group VIA. The host material is doped with at least one of the rare earth elements in its 3+ or 2+ oxidation state. In one embodiment of the invention, two Group IIB elements are selected, namely cadmium and zinc. In an alternate embodiment, three Group IIA elements, magnesium, calcium and strontium, are selected as the host material. The Group VIA element is sulfide and/or selenide. The dopant is composed of one, two or three elements selected from the rare earth elements (lanthanides). In an alternate embodiment, the dopants include $Mn^{2+}$ and one or two of the lanthanides.

18 Claims, 2 Drawing Sheets

ELECTROLUMINESCENT MATERIALS FOR EDGE EMITTERS

TECHNICAL FIELD

The present invention relates generally to edge emitter devices, and more specifically to thin film electroluminescent edge emitters which exhibit increased electroluminescence and increased operational life.

BACKGROUND ART

Electroluminescence is a phenomenon which occurs when certain materials formed with a dopant are subjected to an electric field. The resulting current flow through the material excites the electrons of the dopant to higher energy states. Electromagnetic radiation, for example visible light, is emitted when these electrons fall back to their lower energy states. For a given selection of materials and dopants, the electromagnetic radiation has a specific characteristic spectral distribution.

Electroluminescent materials have typically been used in flat panel displays. One of the best known and presently used materials is ZnS:Mn (zinc sulfide doped with manganese), which emits broad band electromagnetic radiation in the orange/yellow spectral region. Materials, other than ZnS, which emit radiation in other parts of the visible spectrum other than ZnS include SrS and CaS doped with the rare earth elements (lanthanides, Ln) in their 3+ or 2+ oxidation state, $Ln^{2+}$ or $Ln^{2+}$ respectively.

In recent years, electroluminescent (EL) materials have been used in edge emitter arrays in electrophotographic printers, replacing conventional laser scanners and LED bars. Edge emitters rely on the emission of electroluminescent light from the edge of a thin film stack of electroluminescent material. By comparison, typical EL displays emit light substantially normal to a major surface of the device. FIG. 1 illustrates a typical edge emitter stack. An active layer 30, composed of an appropriately doped electroluminescent material, is sandwiched between two dielectric layers 20. A voltage source 40 provides an electric field across the active layer 30, between a pair of electrode layers 22. The resulting electromagnetic radiation emanates from the edge faces E of the active layer 30.

In order to ensure the high light generation efficiencies required for printer applications, edge emitter arrays operate at high electric input power levels. However, present EL materials used in flat panel displays are subject to degradation due to the high drive potentials required for their operation. Since the drive conditions for edge emitter applications are typically 30 to 50 times more severe, the reliability of such materials used in edge emitters is of special concern.

The reason for the low stability of present EL materials, such as ZnS:Ln, is the low solubility of the dopant in the host material. Since the dopant is responsible for the luminescence, it is desirable to maximize the dopant level. However, because of their low solubility, high dopant levels tend to result in an unstable material which quickly degrades.

What is needed is an electroluminescent edge emitter which exhibits high luminosity and maintains its integrity over prolonged use. A host material is needed which can remain stable while having high levels of dopant incorporated within the material.

SUMMARY OF THE INVENTION

A thin film electroluminescent edge emitter device and method for making the same are disclosed. The edge emitter is composed of an active layer sandwiched between two dielectric layers. The dielectric layers, in turn, are disposed between two electrode layers that are formed on the exposed surfaces of the dielectric layers. The active layer is an electroluminescent material composed of a host material that is doped with one or more of the rare earth elements. The host material is a compound of two or more Group II elements and at least one element selected from Group VIA. The dopant is selected from one of the lanthanides in its 3+ or 2+ oxidation state. In an alternate embodiment of the present invention, the host material further includes a second element selected from the Group VIA elements.

The mixture of Group II elements in the host material are cations, such as a mixture of cadmium and zinc or a mixture of magnesium, calcium and strontium. The Group VIA elements of the host material are anions, such as sulfide and selenide. The relative proportions of the component elements of the host material can be expressed as $Cd_{1-x}Zn_xSe_{1-y}S_y$, where $0 \leq x<1$ and $0 \leq y<1$, or as $Mg_xCa_ySr_{1-x-y}Se_{1-x-y}S_z$, where $0 \leq x<1$, $0 \leq y<1$ and $0 \leq z<1$.

In yet another embodiment of the present invention, the host material includes one or two additional impurity elements incorporated as dopants, also selected from the lanthanide series. The present invention further contemplates a host material doped with $Mn^{2+}$ along with two elements selected from the lanthanides.

An advantage of the invention is that the resulting edge emitter is well suited for high luminescence applications, such as printheads in laser printers. The material remains stable under a high electric drive. The high electric drive, in turn, allows for an increase in the electroluminescent effect. In addition, the material of the present invention has a higher luminance efficiency as compared to standard electroluminescent materials.

BEST MODE FOR CARRYING OUT THE INVENTION

Figure 1:
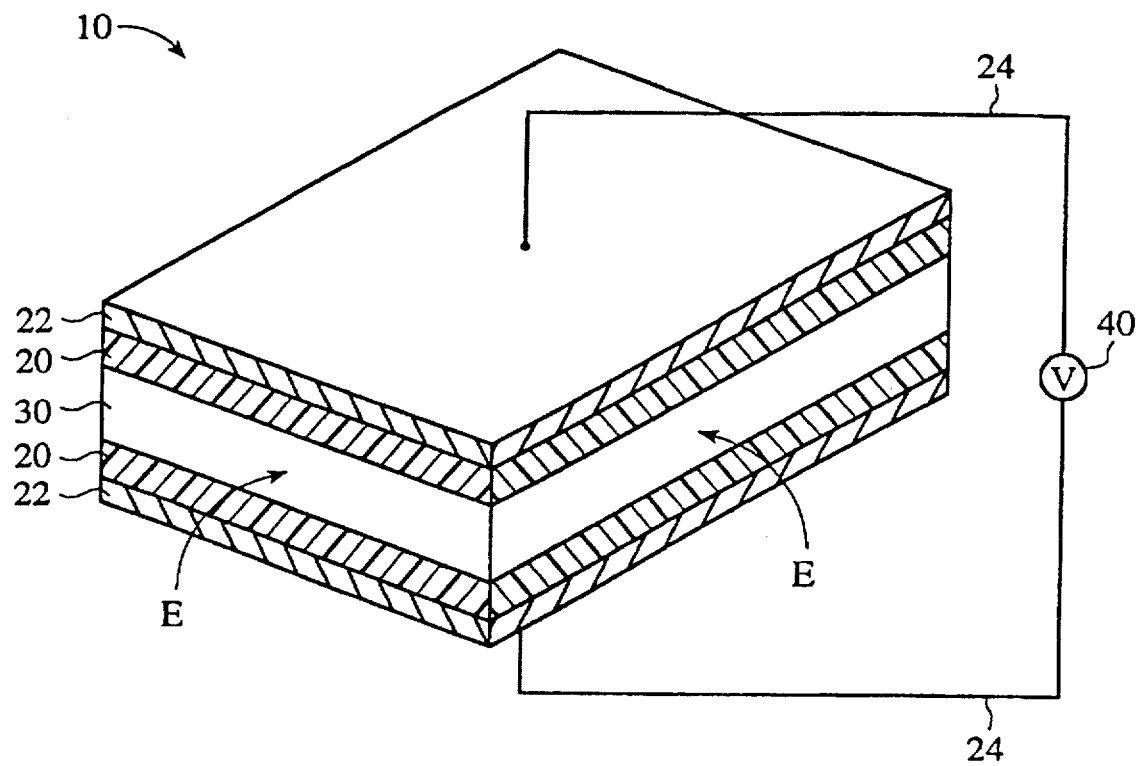
FIG. 1 shows the construction of a typical edge emitter, incorporating the electroluminescent material of the present invention.

FIG. 1 illustrates the typical construction of an edge emitter 10. An electroluminescent active layer 30 is sandwiched between a pair of electrodes 22, each electrode being spaced apart from the material by a dielectric layer 20. A voltage supply 40 coupled to the electrodes by wires 24 provides a sufficiently strong electric field across the active layer 30 to produce an electroluminescent effect in the layer. The resulting electromagnetic radiation emanates from the edges E of the active layer.

The electrodes 22 and the dielectric layers 20 are fabricated using known methods with materials known in the semiconductor arts. For example, chemical vapor deposition (CVD) techniques can be used to form the dielectric layers and the electrode plates. Known photo-etching methods can be employed to form the electrode layers 22 in the desired pattern. Silicon oxinitride can be used as the dielectric material, and indium tin oxide film can be used to form the electrodes.

Figure 2:
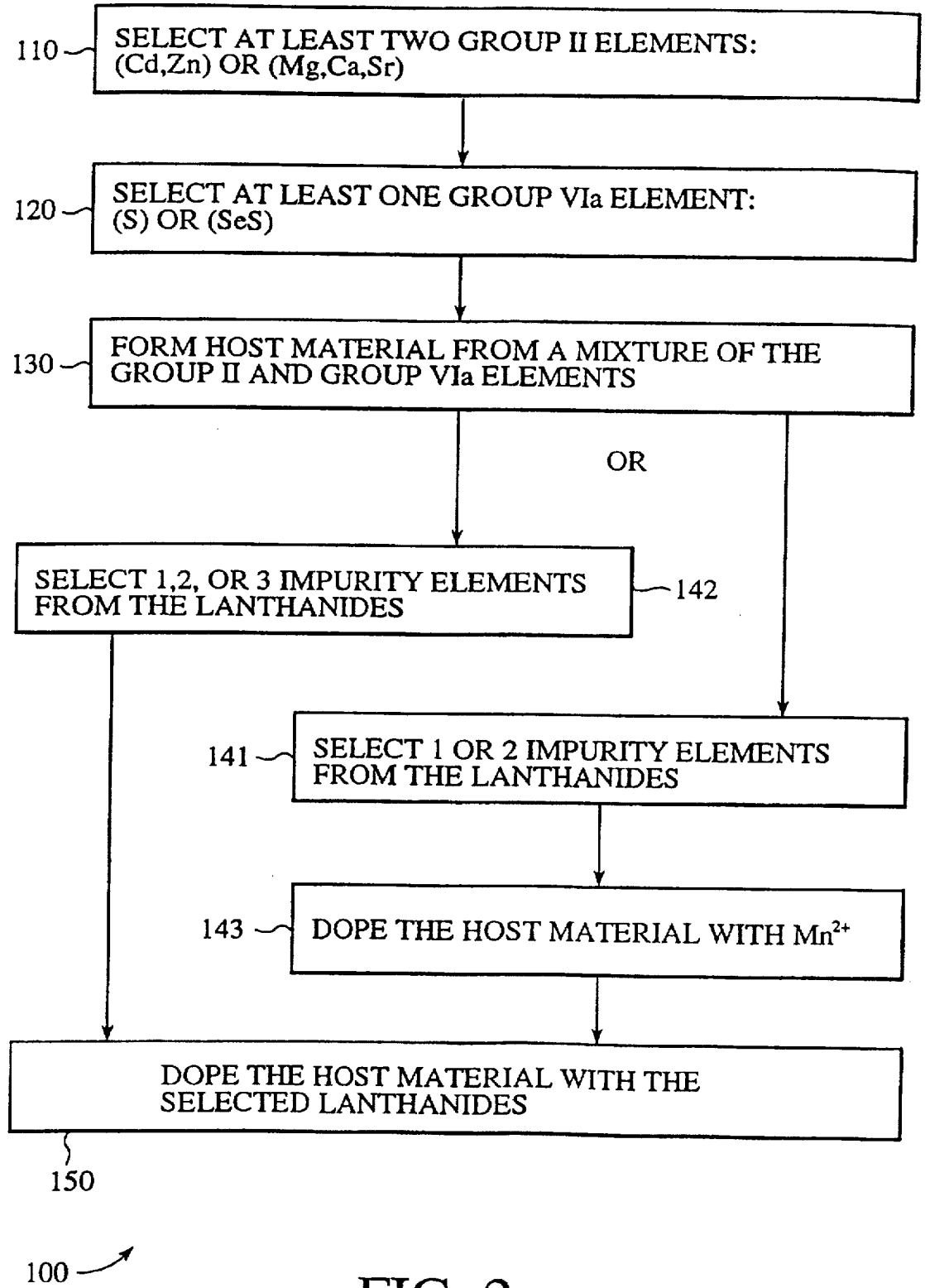
FIG. 2 illustrates the steps for fabricating the electroluminescent material in accordance with the invention.

Turning now to FIG. 2, the composition of the material used as the active layer 30 shown in FIG. 1 will be discussed. Typically, electroluminescent materials are made from Group II and Group VI elements. The most common composition is a compound of zinc cations and sulfide anions, which serves as the host material to which certain impurities (dopants) are added. Typical dopants include $Mn^{2+}$ or the rare earth elements in their 3+ or 2+ oxidation states, the so-called lanthanides. These prior art material compositions exhibit low stability when subjected to the high electric power inputs used in edge emitter applications.

The reason for the low maintenance of such materials is the low solubility (measured in parts-per-million, ppm) of the impurity atoms incorporated in the host material. The electric field segregates the dopant from the lattice structure of the host material, resulting in a drastic decrease in efficiency. The low solubility is believed to arise from two factors: the mismatch of radii between the constituent ions of the host material and the dopant; and the tendency for the lanthanides to generally prefer an octahedral lattice structure, a configuration that is not possible with Group II-VI materials.

The host material used to form the electroluminescent material of the present invention is composed of a mixture of at least two elements selected from Group II, as shown in step 110 of FIG. 2. Thus, in one embodiment, the mixture contains cations of cadmium ($Cd^{2+}$) and zinc ($Zn^{2+}$). In another embodiment of the invention, the mixture contains cations of magnesium ($Mg^{2+}$), calcium ($Ca^{2+}$) and strontium ($Sr^{2+}$). In addition to the cations, the host material includes one or more anions of the Group VIA elements; e.g. sulfide and/or selenide as shown in step 120.

The proportions of the components in the above-identified mixture can be represented as $Cd_{1-x}Zn_xSe_{1-y}S_y$, where $0 \leq x < 1$ and $0 \leq y < 1$. Various mixtures can be obtained by adjusting the values of "x" and "y." However, it has been observed that optimum values of "x" and "y" fall within the range from 0.25 to 0.5. Host materials having constituent proportions within the optimum range provide the best balance between solubility of the dopant and electroluminescent efficiency. Likewise, the alternate mixture composed of magnesium, calcium and strontium can be written as $Mg_xCa_ySr_{1-x-y}Se_{1-z}S_z$, where $0 \leq x < 1$, $0 \leq y < 1$ and $0 \leq z < 1$. The optimum values for "x, . . . . y" and "z" also fall within the range from 0.25 to 0.5.

It has been observed that the solubility of dopants in such materials is higher than in the prior art compositions. It is believed that host material made from the above-described mixture of elements produces a slightly distorted crystal field which is less rigid, resulting in a more stable lattice structure when one of the above-mentioned dopants is incorporated into the host material. For example, a mixture containing cadmium in addition to zinc is believed to slightly distort the crystalline structure of the host material by "pushing" aside some of the zinc atoms, thus providing more room for the dopant.

The discussion turns now to the impurity elements used to dope the host material. Electroluminescence originates from the dopants incorporated into the host material. When the electroluminescent material is subjected to an electrical field, the electrons in the dopant are excited to a higher energy level. When the electrons fall back to their lower energy levels, they release electromagnetic radiation in the process. The wavelength of the emitted radiation varies depending upon the particular element used as the dopant.

Both step 142 and steps 141, 143 of FIG. 2 show that the impurity elements used as dopants are selected from the lanthanide series, also known as the rare earth elements. Typically, the 3+ and 2+ oxidation states of the lanthanides are used. For example, radiation emissions in the near ultraviolet region of the spectrum can be obtained from $Ce^{3+}$ and $Gd^{3+}$. Radiation in the visible range of the spectrum is possible. For example: europium (Eu) emits red light; terbium (Tb) emits green light; thulium (Tm) emits blue light; and samarium (Sm) emits reddish-orange light.

Typically, a single type of impurity atom is used as the dopant. In accordance with the present invention, it has been observed that the efficiency of the electroluminescent material can be greatly enhanced by doping the host material with two or three different impurity atoms selected from the lanthanides, step 142. It also has been observed that doping the host material with $Mn^{2+}$ along with one or two of the lanthanides serves to enhance the efficiency of the resulting electroluminescent material, steps 141, 143.

The fabrication step 150 of electroluminescent materials in accordance with the invention can be accomplished using presently known fabrication techniques. Thus, the host material can be formed by any of the known vapor deposition methods or by metal organic chemical vapor deposition (MOCVD) or liquid phase deposition. Likewise, the host material can be doped using any of the known methods, such as diffusion doping of the melt during formation of the host material or ion implantation of the host material followed by an anneal.

We claim:

1. A thin film electroluminescent edge emitter device comprising:

an active monolithic layer having opposed major surfaces;

a first and a second dielectric layer, each said dielectric layer formed upon one of said major surfaces of said active layer thereby leaving exposed an edge face of said active layer; and a first and a second electrode layer, each said electrode layer formed upon an exposed surface of said dielectric layers;

said active monolithic layer comprising:

a host compound including a mixture of at least two cations selected from the Group II elements and a first anion selected from the Group VIA elements; and a first impurity element selected from the group of rare earth elements, said first impurity element having one of a 3+ oxidation state and a 2+ oxidation state;

said host compound being doped with said first impurity element.

2. The edge emitter of claim 1, wherein said at least two cations is one of ($Cd^{2+},Zn^{2+}$) and ($Mg^{2+},Ca^{2+},Sr^{2+}$).

3. The edge emitter of claim 2, wherein said host compound further includes a second anion selected from the Group VIA elements.

4. The edge emitter of claim 3, wherein said first anion is $S^{2-}$ and said second anion is $Se^{2-}$.

5. The edge emitter of claim 1, wherein said host compound further includes the anion selenide, said mixture of at least two cations is (Cd,Zn) and said first anion is $S^{2-}$, relative proportions of said cations and said anions being $Cd_{1-x}Zn_xSe_{1-y}S_y$, where $0 \leq x < 1$ and $0 \leq y < 1$.

6. The edge emitter of claim 5, wherein x is in the range from 0.25 to 0.5.

7. The edge emitter of claim 1, wherein said host compound further includes the anion selenide, said mixture of at least two cations is (Mg,Ca,Sr) and said first anion is S, relative proportions of said cations and said anions being $Mg_xCa_ySr_{1-x-y}Se_{1-z}S_z$, where $0 \leq x < 1$, $0 \leq y < 1$ and $0 \leq z < 1$.

8. The edge emitter of claim 7, wherein x is in the range from 0.25 to 0.5.

9. The edge emitter of claim 1, wherein said host compound is further doped by a second impurity element and by a third impurity element, each selected from the rare earth elements.

10. The edge emitter of claim 1, wherein said host compound is further doped by $Mn^{2+}$ and by a second impurity element selected from the rare earth elements.

11. An edge emitting electroluminescence device, comprising:

an emitting layer composed of a host material doped with at least one dopant, said at least one dopant being a lanthanide and having one of a 3+ oxidation state and a 2+ oxidation state;

a pair of dielectric layers sandwiching said emitting layer; and a pair of conductive layers sandwiching said dielectric layers and said emitting layer;

said host material having at least two cations selected from the Group II elements and at least one anion selected from the Group VIA elements, said at least two cations being one of ($Cd^{2+}$, $Zn^{2+}$) and ($Mg^{2+}$, $Ca^{2+}$, $Sr^{2+}$), said at least one anion being one of ($S^{2-}$) and ($Se^{2-}$, $S^{2-}$).

12. The device of claim 11, wherein said host material is further doped by a second dopant selected from the rare earth elements and by a third dopant, said third dopant being one of $Mn^{2+}$ and the rare earth elements.

13. The device of claim 11, wherein the proportion of said at least two cations and said at least one anion is one of $Cd_xZn_{1-x}Se_yS_{1-y}$ ($0 \leq x<1$, $0 \leq y<1$) and $Mg_xCa_ySr_{1-x-y}Se_zS_{1-z}$ ($0 \leq x<1$, $0 \leq y<1$, $0 \leq z<1$).

14. The device of claim 13, wherein x is in the range from 0.25 to 0.5.

15. An edge emitting electroluminescence device, comprising:

an emitting layer composed of a host material doped with a first dopant;

a pair of dielectric layers sandwiching said emitting layer; and a pair of conductive layers sandwiching said dielectric layers and said emitting layer;

said host material having at least two cations selected from the Group II elements and at least one anion selected from the Group VIA elements, said at least two cations being selected from ($Mg^{2+}$, $Ca^{2+}$, $Sr^{2+}$), said at least one anion being selected from ($S^{2-}$) and ($Se^{2-}$, $S^{2-}$);

said first dopant being selected from the rare earth elements.

16. The device of claim 15, wherein said host material is further doped by a second dopant selected from the rare earth elements and by a third dopant, said third dopant being one of $Mn^{2+}$ and the rare earth elements.

17. The device of claim 15, wherein the proportion of said at least two cations and said at least one anion is one of $Mg_xCa_ySr_{1-x-y}Se_zS_{1-z}$ ($0<x<1$, $0 \leq y \leq 1$, and $0 \leq z<1$).

18. The device of claim 17, wherein x is in the range from 0.25 to 0.5.

* * * * *